S. Heywood,
Sawing Shingles.
No 53,823.  Patented Apr. 10, 1866.
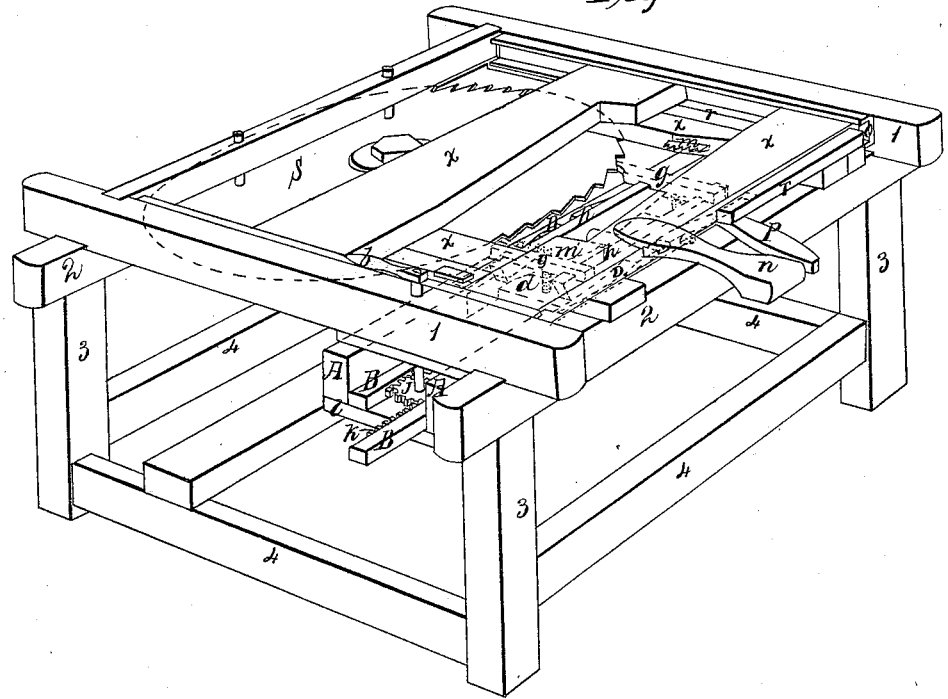
Fig: 1.
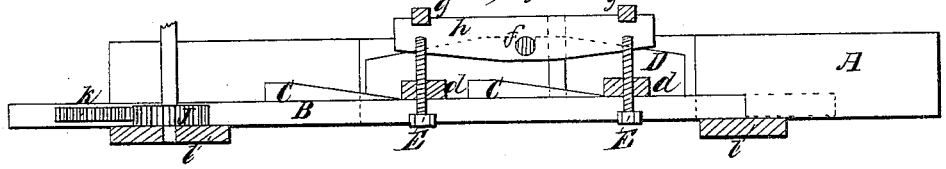
Fig: 2.
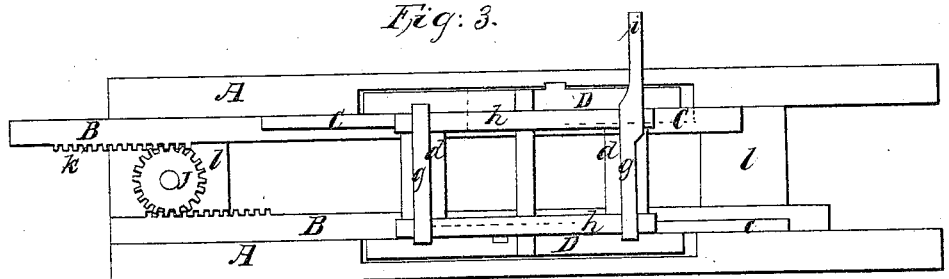
Fig: 3.
Witnesses:
Daniel C. Colby
Jonas Whitt
Inventor:
Simeon Heywood

UNITED STATES PATENT OFFICE.

SIMEON HEYWOOD, OF CLAREMONT, NEW HAMPSHIRE.

IMPROVEMENT IN SHINGLE-MACHINES.

Specification forming part of Letters Patent No. 53,823, dated April 10, 1866.

*To all whom it may concern:*

Be it known that I, SIMEON HEYWOOD, of Claremont, in the county of Sullivan, State of New Hampshire, have invented certain new and useful Improvements in Machines for Sawing Shingles and other Thin Lumber; and I do hereby declare the following to be a full and exact description of the same, reference being had to the drawings that accompany and form a part of this specification, in which—

Figure I is a perspective view of the machine, (transparent drawings;) Fig. II, a sectional view of the parts to which the invention relates; Fig. III, a top-plan view of the same parts.

A A represent two cross-bars, held in place by the bolts $y\ y\ y\ y$, which pass up through the beams 1 1; B B, two sliding bars lying between the bars A A, as seen in Fig. I. C C C C are blocks or strips of iron or wood, with their upper surfaces inclined, as seen in Fig. II; $l\ l$, short bars connecting A A from their under surfaces, and serve to support the bars B B.

The bars B B, with the inclined blocks C C C C, and the bars A A, with the connections $l\ l$, constitute a supporting-frame to the lumber-bed.

D D are the two sides of the bottom part of the tilting lumber-bed, and are connected together by the cross-pieces $d'\ d'$.

E E are screws running firmly through the bars $d'\ d'$, and by their upper ends serve to determine the amount of tilting the upper part of the tilting bed shall have, the amount being the distance between the top of these screws and the cross-bars $g\ g$.

$f$ is the shaft on which the upper part of the lumber-bed tilts, said upper part being composed of the strips $h\ h$, cross-pieces $g\ g$, and the said shaft $f$.

$i$ is a pin attached to the strip $h$ at its end, on the right hand, and extends beneath the saw, some half-inch therefrom, about three inches, and serves to keep the shingle or other piece being sawed off from falling until the teeth of the saw shall have cut entirely through, so as not to leave any little knobs on the corners.

$J'$ is the pinion by which the bars B B are moved back and forth, the teeth of this pinion meshing into the teeth of the racks $k\ k$.

$m\ m'$ are dogs with teeth to hold the blocks while the saw is running through.

The levers P and $t$, with their connecting-rod $r$, serve to operate the dog $m$, the dog $m'$ being stationary.

The principal parts of the frame which holds the block and carries it forward over the saw are indicated by the letter X, and will be sufficiently understood from the drawings.

The object of my invention is to provide a machine for sawing shingle or other thin stuff, either tapering or of uniform thickness throughout, one that will saw shingles of any desired thickness at either end, shall so present the wood to the saw that the teeth may cut as much as possible lengthwise—that is, with the grain—and shall have such facilities for adjusting the various parts that any defect in the block, such as a decayed spot or a knot, may, by a single run of the saw, be cut off without removing the block or stopping the machine.

I will give a more particular description of the parts that compose my invention.

The bars A A, I make about five inches deep and from one and one-fourth to one and one-half inch thick; the sliding bars B B, from one and one-fourth to one and three-eighths inch square; the inclines C C C C, nine inches in length, one and one-half inch in height at one end, and running to an edge at the other, as seen in Fig. II. These blocks have the inclined surfaces looking in one direction on one of the bars B B and in the opposite direction on the other, so that as the pinion J is turned, moving one of the bars B toward the right and the other toward the left, the lumber-bed is raised or lowered uniformly at all its corners.

The bed on which the block to be sawed rests will sustain itself at any point desired, for, as has before been mentioned, the inclined surfaces of the blocks C C C C are in each of their pairs in opposite directions. The advantages of these inclined planes are very numerous. For instance, in taking up a block for shingle, if it is found not to have a good surface on any side to commence upon, or the best quality of the shingle requires that it should be faced upon a different side, in a moment, by turning the lever $b$ connected with the pinion J, the lumber-bed is lowered to the required distance and a slab taken off. In the same way a decayed part or a knot is removed, all of which are often requisite, yet none of them are provided for by any other machine.

In consequence of the above-mentioned capacity of my machine, it becomes one of the best for splitting up dimension stuff of any thickness from one-eighth of an inch to two inches—a range no other machine of this kind can lay any claim to.

What I claim, and desire to secure by Letters Patent, is—

In a shingle or other machine, the arrangement of the bars A A, the movable bars B B, the inclined planes C C C C, the racks $k\ k$, and the pinion J, applied to the tilting bed, as and for the purposes set forth.

SIMEON HEYWOOD.

Witnesses:
DANIEL C. CALLEY,
JONAS WHITE.